(12) United States Patent
Zhang

(10) Patent No.: US 9,959,874 B2
(45) Date of Patent: *May 1, 2018

(54) ONE WAY SOUND

(71) Applicant: eBay Inc., San Jose, CA (US)

(72) Inventor: Yihong Zhang, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/467,020

(22) Filed: Aug. 24, 2014

(65) Prior Publication Data

US 2014/0365224 A1 Dec. 11, 2014

Related U.S. Application Data

(63) Continuation of application No. 11/640,653, filed on Dec. 18, 2006, now Pat. No. 8,825,487.

(51) Int. Cl.
| | |
|---|---|
| *G10L 17/24* | (2013.01) |
| *G10L 17/22* | (2013.01) |
| *G06F 21/43* | (2013.01) |
| *G06F 21/44* | (2013.01) |
| *G06Q 20/40* | (2012.01) |
| *G06Q 50/26* | (2012.01) |

(52) U.S. Cl.
CPC .............. *G10L 17/22* (2013.01); *G06F 21/43* (2013.01); *G06F 21/445* (2013.01); *G06Q 20/4014* (2013.01); *G06Q 50/265* (2013.01)

(58) Field of Classification Search
CPC ......... G10L 17/00; G10L 17/04; G10L 17/22; G10L 17/24; G10L 17/26

USPC ..... 704/273, 246, 250, 270, 270.1, 272, 278
See application file for complete search history.

(56) References Cited

U.S. PATENT DOCUMENTS

| | | | |
|---|---|---|---|
| 7,133,501 | B2 | 11/2006 | Herron et al. |
| 7,450,701 | B2 | 11/2008 | Crockett et al. |
| 7,685,631 | B1 | 3/2010 | Paya et al. |
| 7,730,321 | B2 | 6/2010 | Gasparini et al. |
| 8,825,487 | B2 | 9/2014 | Zhang |
| 2002/0106074 | A1 | 8/2002 | Elliott |

(Continued)

OTHER PUBLICATIONS

"U.S. Appl. No. 11/640,653, Final Office Action dated Jul. 8, 2010", 26 pgs.

(Continued)

*Primary Examiner* — Qi Han
(74) *Attorney, Agent, or Firm* — Schwegman Lundberg & Woessner, P.A.

(57) ABSTRACT

A method and a system for identity authentication are presented. In one example embodiment, audio data (e.g. a sound wave) may be received from a user. The audio data may be used to establish an identity of an entity to the user. The audio data may be stored at a storage location; and be presented to the user to establish the identity of the entity when the entity participates in an electronic communication with the user. In another example embodiment, a server (e.g., a web client or client application server) may present a plurality of audio files to a user; receive a user selection of selected audio data from the plurality of audio files; responsive to the user selection, the server may communicate, via a network, the selected audio data to another server. The selected audio data may be used as an identity authentication.

16 Claims, 14 Drawing Sheets

(56) References Cited

U.S. PATENT DOCUMENTS

| | | |
|---|---|---|
| 2004/0161083 A1 | 8/2004 | Crockett et al. |
| 2006/0072723 A1 | 4/2006 | Chung |
| 2006/0090073 A1* | 4/2006 | Steinberg ................ G06F 21/31 713/170 |
| 2006/0259767 A1 | 11/2006 | Mansz et al. |
| 2007/0162961 A1 | 7/2007 | Tarrance et al. |
| 2007/0255953 A1 | 11/2007 | Peyret |
| 2008/0034428 A1 | 2/2008 | Bejar et al. |
| 2008/0109657 A1 | 5/2008 | Bajaj et al. |
| 2008/0141353 A1 | 6/2008 | Brown |
| 2008/0148151 A1 | 6/2008 | Zhang |
| 2008/0229109 A1 | 9/2008 | Gantman et al. |

OTHER PUBLICATIONS

"U.S. Appl. No. 11/640,653, Non Final Office Action dated Nov. 29, 2013", 16 pgs.

"U.S. Appl. No. 11/640,653, Non-Final Office Action dated Feb. 4, 2010", 18 pgs.

"U.S. Appl. No. 11/640,653, Notice of Allowance dated Apr. 30, 2014", 12 pgs.

"U.S. Appl. No. 11/640,653, Response filed Feb. 18, 2014 to Non Final Office Action dated Nov. 29, 2013", 20 pgs.

"U.S. Appl. No. 11/640,653, Response filed Jan. 6, 2011 to Final Office Action dated Jul. 8, 2010", 15 pgs.

"U.S. Appl. No. 11/640,653, Response filed May 4, 2010 to Non Final Office Action dated Feb. 4, 2010", 22 pgs.

Tally, et al., "Anti-Phishing: Best Practices for Institutions and Consumers", McAfee Research, (Sep. 2004).

\* cited by examiner

ONE WAY SOUND

PRIORITY

This application is a continuation of and claims the benefit of priority under to U.S. patent application Ser. No. 11/640,653, filed on Dec. 18, 2006, which is hereby incorporated by reference herein in its entirety.

TECHNICAL FIELD

The present application relates generally to the technical field of data authentication and, in one specific example, to the use of audio data for authentication of electronic communication.

BACKGROUND

For customers of businesses entities, such as Internet-based auction facilities, banks, and other financial institutions, when receiving any communication from the business, verification of the identity of the business is particularly important for enhancing customer trust in the business. Some financial institutions have started using images for identity authentication. These institutions, typically, first ask each of their customer to select an image from a group of images presented to them via their web site. Then any time a user logs into their system to initiate a transaction, the system presents the selected image to identify the institute to the user, so that the user is confident an spoof website is not involved.

Therefore, it will be advantageous to provide user of various business entities with the opportunity to verify the identity of specific business entities from which they receive a call, text message or email. In particular, the users' confidence may be further augmented if they are ask to provide the authentication tool, e.g. audio data to uniquely identify and validate the business that is trying to communicate with them. For example, PAYPAL (a subsidiary of EBAY Inc., of San Jose, Calif.) now provides the users with a service which allows the user to transfer money using mobile phone. It will be particularly advantageous to provide the users of PAPAL, for example, a method to identify PAYPAL, using a customized audio data (e.g., a sound waves), when receiving a phone call from the company.

BRIEF DESCRIPTION OF THE DRAWINGS

Some embodiments are illustrated by way of example and not limitation in the figures of the accompanying drawings in which.

DETAILED DESCRIPTION

Figure 1:
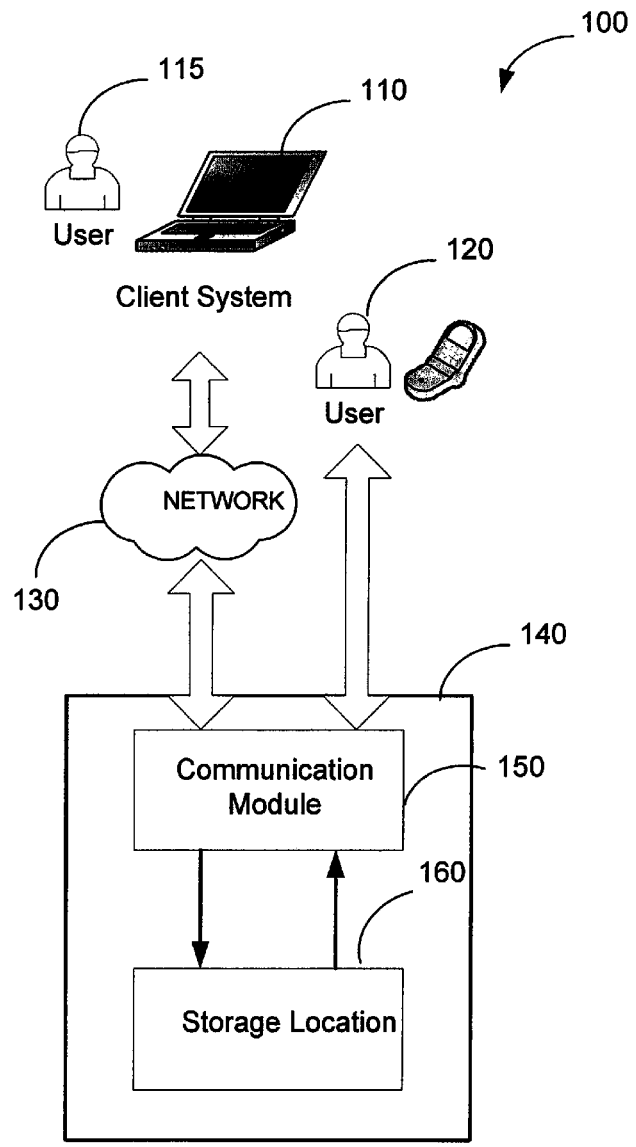
FIG. 1 is a high level diagram depicting an example embodiment of an authentication system.

Example methods and systems to authenticate communication between a system and its users using audio data are described. In the following description, for purposes of explanation, numerous specific details are set forth in order to provide a thorough understanding of example embodiments. It will be evident, however, to one skilled in the art that the present invention may be practiced without these specific details.

A method and a system for authentication of electronic communication between a system and its users are provided. In one example embodiment, a system (e.g., a network-based commerce system, a bank or any financial institution) may receive, audio data from a user, the audio data being used to establish an identity of a first entity to the user; the system may store the audio data at a storage location (e.g. a file associated with the user stored on a storage device); and may present the audio data to the user to establish an identity of the first entity when the first entity participates in an electronic communication with the user. In example embodiments, electronic communication may include text-based communication (e.g., electronic mail (e-mail), instant message (IM), Short Message Service (SMS), facsimile), or audio communication over the Internet (e.g., Voice over IP (VoIP), or SKYPE, an Internet telephony service), or telephone call using wired Plain Old Telephone Service (POTS), or wireless networks (e.g., mobile, cellular, WiFi, and WiMAX).

In example embodiments, the storage location may be at a server system remote from a client system of the user, and the presenting of the audio data may include communicating the audio data from the server system to the client system to establish the identity of the first entity. Also, presenting of the audio data may include generating an audio playback that is communicated to the user during the electronic communication.

The storage location may also be at a client system of the user, and the method may include receiving a validation of the identity of the user at the client system prior to the presenting of the audio data to the user.

In example embodiments, the first entity may be an agent of a business entity (e.g., a network-based commerce system, a financial institution such as a bank) electronically communicating with the user; the first entity may be a machine (e.g. a computer based system) electronically communicating with the user, on behalf of a business entity.

In one example embodiment, a user interface (e.g. a web page or a client application) may present a plurality of audio data instances (e.g. pre-recorded sound waves) to a user; receive a user selection of selected audio data from the plurality of audio data instances (e.g., the user interface may present a plurality of sound waves to the user, so that the user may select a desired one from the presented sound waves), the selected audio data (e.g. the user selected sound wave) being used as an identity authentication (e.g. to assure the user of the identity of the system; the system may then, responsive to the user selection, communicate, via a network, the selected audio data to a server.

The authentication of the communication between a system and its users augments the trust of the users in the system; and each time the system tries to communicate with the user, it may provide them with confidence that no spoof entity is involved. Indeed, both the system and the users may benefit from such authenticated communication.

System Architecture

FIG. 1 is a high level diagram depicting an example embodiment of a networked authentication system 100. The system may include a networked server 140 communicating with a user 120 and a client system 110 (e.g. a web client or a client application). The networked server 140 may include a communication module 150 and a storage location 160.

In example embodiments, the communication module 150 may be a communication server. The communication module may receive audio data from the user 120 and store that in the storage location 160 associated with the user 120. The communication module 150 may then retrieve the stored audio data from the storage location 160 and communicate the audio data to the user to establish identity of the networked server 140. The audio data may be generated from a sound wave (e.g. human voice) received from the user 120. The user 120 may be presented with a plurality of sound waves to select from. The networked server 140 then may store the selected sound wave as an audio data associated with the user 120 in the storage location 160.

In one example embodiment, the receiving of the audio data from the user 120 and storing the audio data at a storage location 160 may take place at a first incidence of the first entity participating in an electronic communication with the user.

In one example embodiment, the receiving of the audio data from the user 120 may include receiving a sound wave from the user 120, and converting the sound wave into the audio data. The receiving of the sound wave from the user 115 may constitute uploading a pre-recorded sound wave file from the client system 110, via the network 130, into a server site of the networked server 140.

In an example embodiment, the networked server 140 may use the communication module 150 to communicate, via a network 130 (e.g., the Internet), with a client system 110. The networked server 140 may present via a user interface in the client system 110 a plurality of audio data instances (e.g. sound waves) to a user 115 of the client system 110. The user 115 may select a desired audio data from the audio data instances provides by the networked server 140. The networked server 140 then may store the user selection in the storage location 160 associated with the user 115. The networked server 140 may then retrieve the stored audio data and play back the audio data, to identify the owner of the networked server 140 (e.g. a business entity), to the user 120 whenever a phone call is made or a text message or email is sent to the user 120; or to the user 115 of the client system 110, whenever any communication with the user 115 is established, via the network 130, through client system 110. The networked server 140 may be the server of a business entity, such as a network based commerce system, a bank, or any other financial or commercial institution.

In one example embodiment, the storage location may be located at a client system 110 of the user, and the presenting of the audio data may include receiving a validation of the identity of the first entity at the client system 110.

Figure 2:
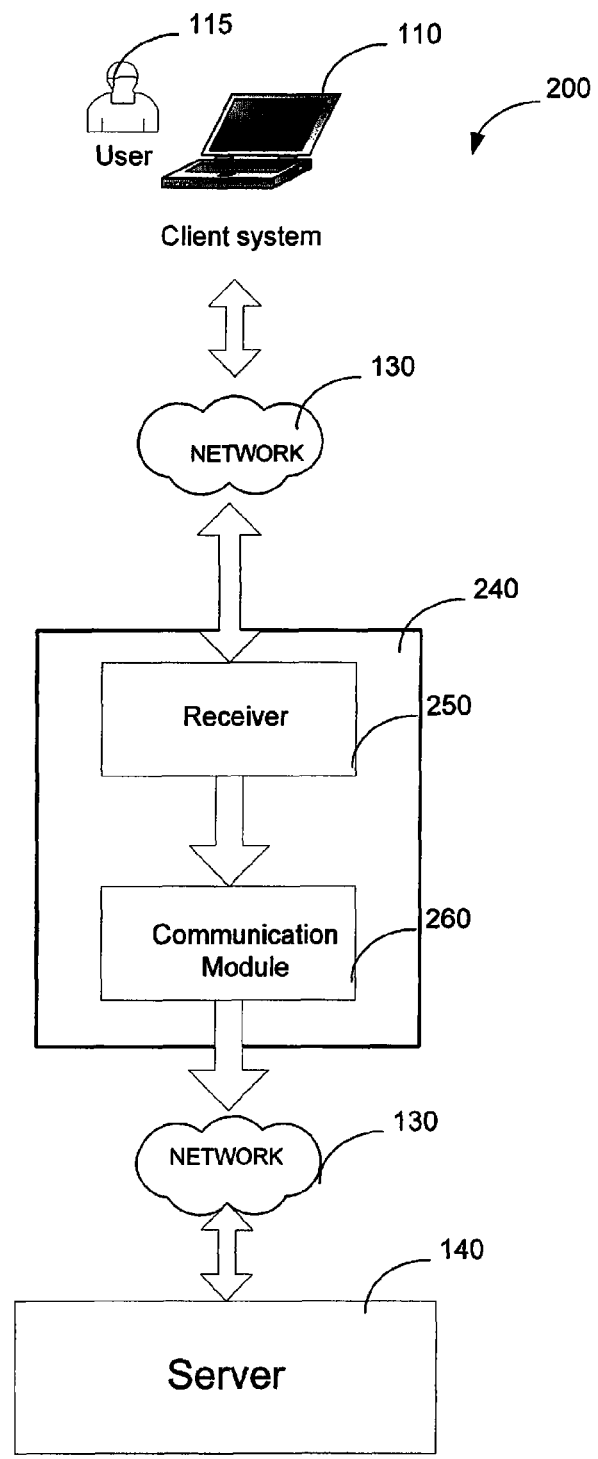
FIG. 2 is a high level block diagram illustrating an example embodiment of a system for receiving authentication data and communicating to a server.

FIG. 2 is a high level block diagram illustrating an example embodiment of a system 200 for receiving authentication data and communicating to a server. The system 200 may include a subsystem 240 communicatively coupled, via the network 130, with a networked server 140 and the user 120, or the user 115 of the client system 110. The subsystem 240 may include a receiver module 250 (hereinafter, "receiver") and a communication module 260.

In an example embodiment, the receiver 250 may receive audio data, via the network 130, from the user 115 of the client system 110. The communication module 260 then may communicate the audio data received by the receiver 250, via the network 130, to the networked server 140. The audio data may then be used by the networked server 140 to establish identification of the owner of the networked server 140 to a user of the networked server 140.

Figure 3:
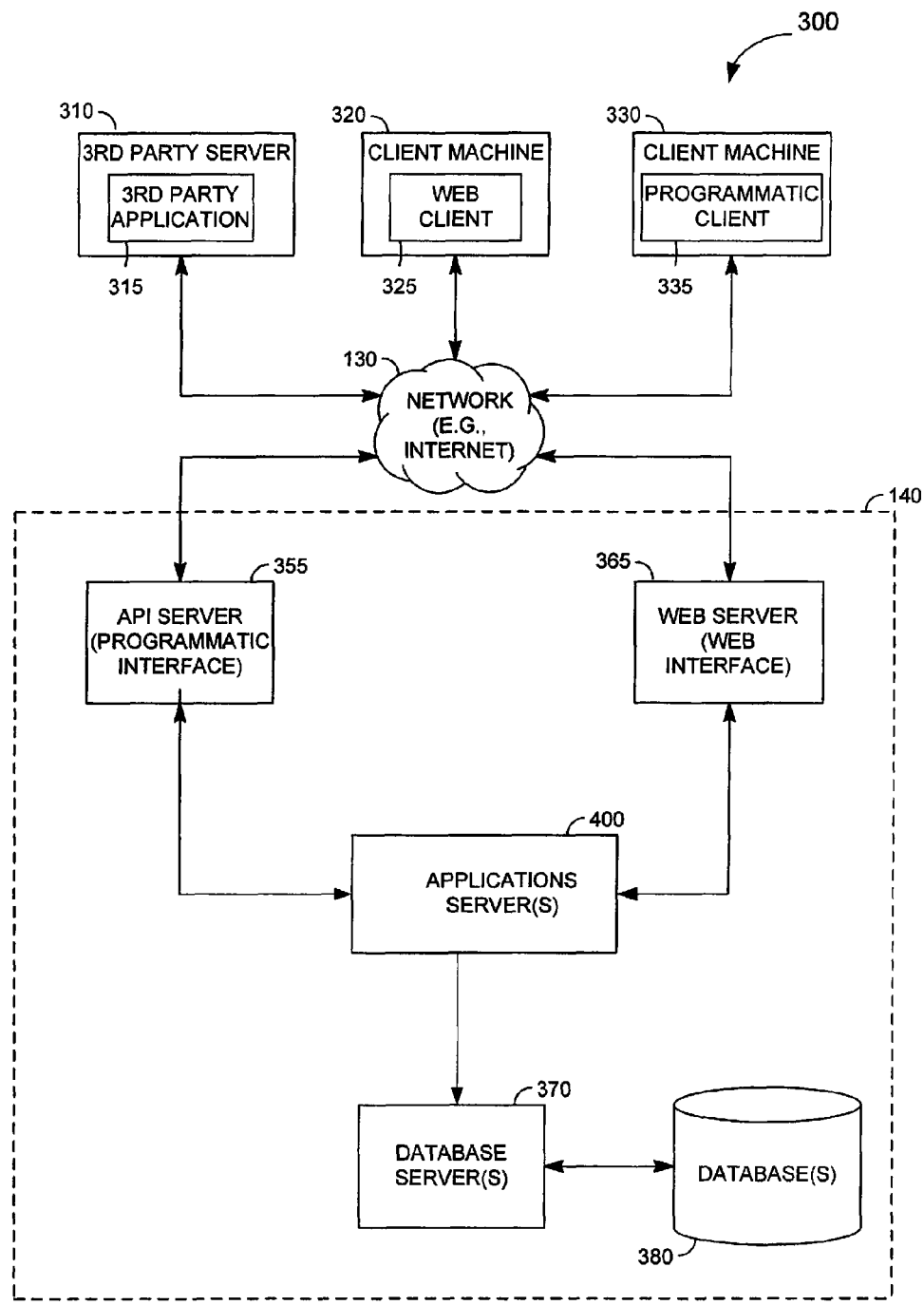
FIG. 3 is a high-level block diagram illustrating an example embodiment of a network based server system.

FIG. 3 is a high-level block diagram illustrating an example embodiment of a networked server system 300. A networked server 140 may provide server-side functionality, via a network 130 (e.g., the Internet or Wide Area Network (WAN)) to one or more clients. FIG. 3 illustrates, for example, a web client 325 (e.g., a browser, such as the WINDOWS® INTERNET EXPLORER® browser developed by Microsoft Corporation of Redmond, Wash. State), and a programmatic client 335 executing on respective client machines 320 and 330.

An Application Program Interface (API) server 355 and a web server 365 may be coupled to, and provide programmatic and web interfaces respectively to, one or more applications server(s) 400. The applications server(s) 400 may host one or more server applications shown in FIG. 4. The applications server(s) 400 are, in turn, shown to be coupled to one or more database server(s) 370 that facilitate access to one or more database(s) 380.

Further, while the networked server 140 shown in FIG. 3 may employ a client-server architecture, the present application is of course not limited to such an architecture, and could equally well find application in a distributed, or peer-to-peer, architecture system, for example. The web client 325 may access the applications server(s) 400 via the web interface supported by the web server 365. Similarly, the programmatic client 335 may access the various services and functions provided by the networked server 140 and applications server(s) 400 via the programmatic interface provided by the API server 355. The programmatic client 335 may, for example, be a sound application to enable the networked server 140 to retrieve a stored audio data from the storage location 160 and convert it to a play back sound wave or to convert a sound wave received from a user to audio data to be stored in the storage location 160.

Figure 4:
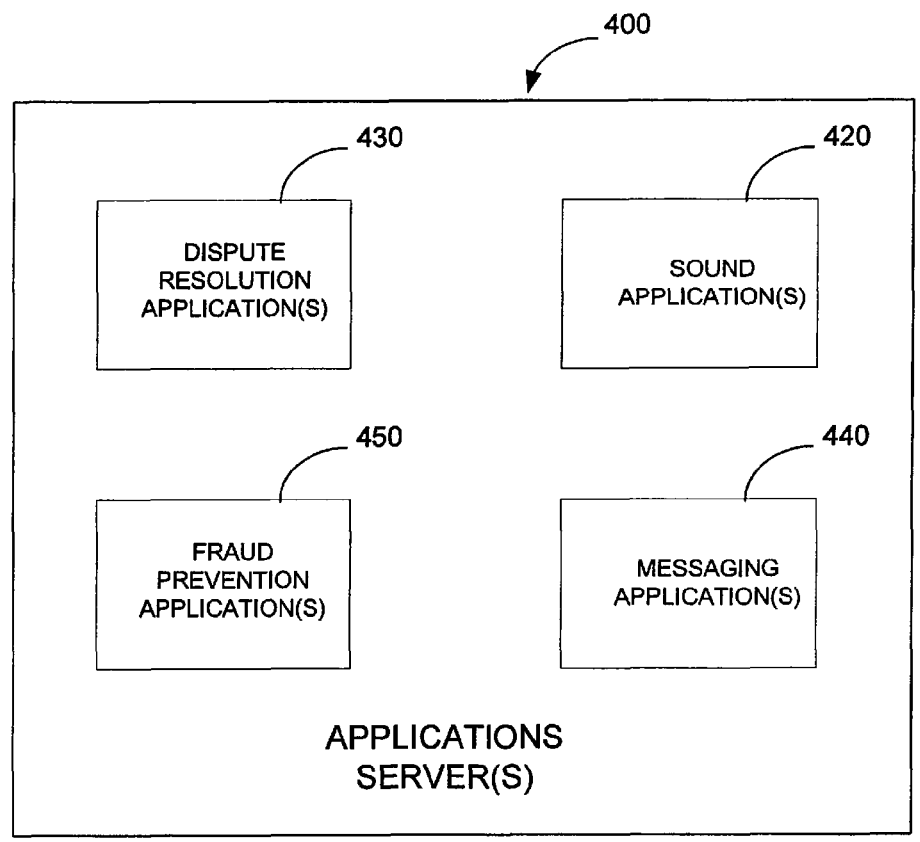
FIG. 4 is a block diagram illustrating an example application server.

FIG. 4 is a block diagram illustrating an example application server 400. The applications sever 400, may include a sound application 420, a dispute resolution application 430, a messaging application(s) 440 and a fraud prevention application 450. The applications may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more database(s) 380 via the database server(s) 370.

Dispute resolution applications 430 may provide mechanisms whereby disputes arising between transacting parties may be resolved. For example, the dispute resolution applications 430 may provide guided procedures whereby the parties are guided through a number of steps in an attempt to settle a dispute. In the event that the dispute cannot be settled via the guided procedures, the dispute may be escalated to a third entity mediator or arbitrator.

A number of fraud prevention applications 450 implement fraud detection and prevention mechanisms to reduce the occurrence of fraud within the networked server 140.

Messaging application(s) 440 are responsible for the generation and delivery of messages to users of the networked server 140, in the example of a network based commerce system, such messages may be used for advising users regarding the status of listings at the networked server (e.g., providing "outbid" notices to bidders during an auction process or to provide promotional and merchandising information to users). Respective messaging application(s) 440 may utilize any one of a number of message delivery networks and platforms to electronically communicate with users to deliver messages to users.

Sound applications 420 may enable the networked server 140 to retrieve a stored audio data from the storage location 160 and convert it to a play back sound wave or to convert a sound wave received from a user to audio data to be stored in the storage location 160.

Figure 5:
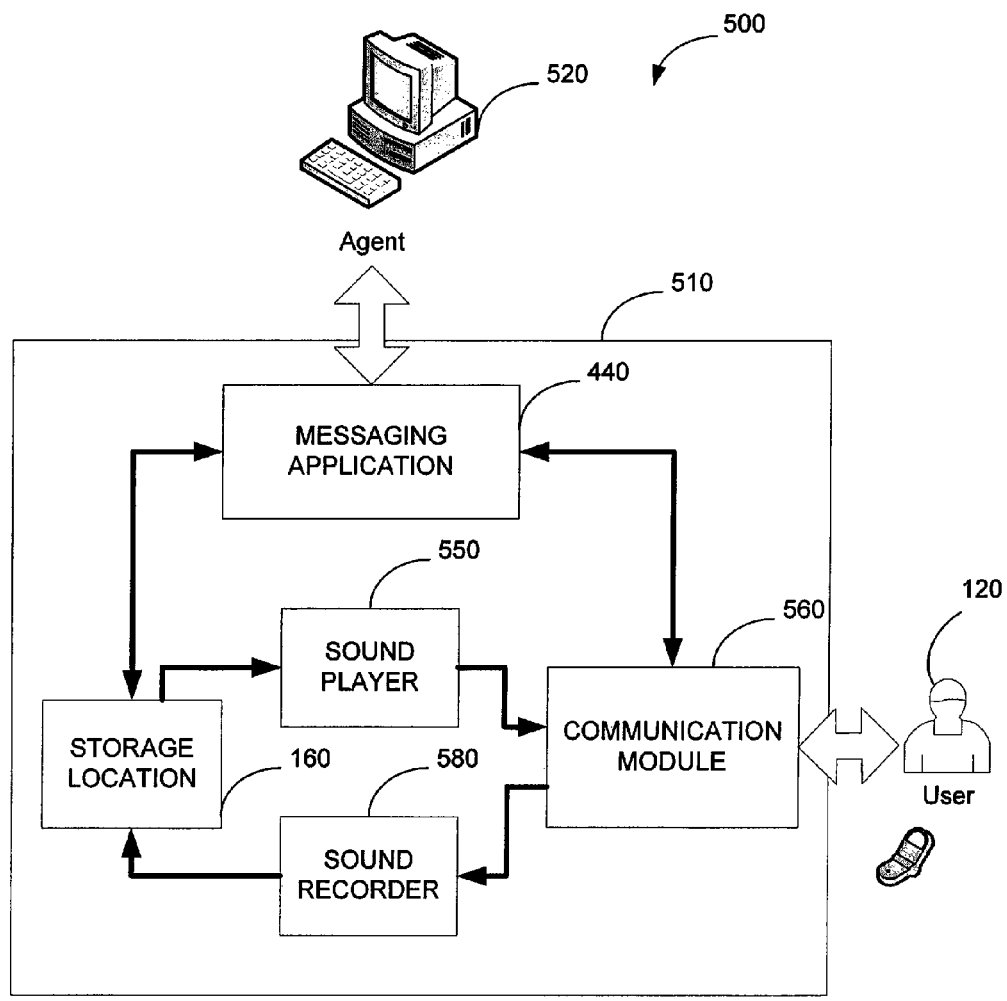
FIG. 5 is a block diagram illustrating an example embodiment of a system for receiving, storing and playing back audio data.

FIG. 5 is a block diagram illustrating an example embodiment of a system 500 for receiving, storing and playing back audio data. The system 500 may include a server 510 communicatively coupled to the user 120 and an agent computer 520. The server 510 may include a messaging application 440, a communication module 560, the storage location 160, a sound player 550, and a sound recorder 580.

In one example embodiment, the agent 520 may try to use a messaging application 440 of the application server 400 to communicate with the user 120. The agent 520 may initiate the communication automatically; or may receive a instruction to that effect from a live agent who may represent a business entity. In either case, the agent application may send instructions to messaging application 440 to receive audio data from the user 120. The audio data to be used to identify the business entity to the user 120, whenever the agent 520 or a live agent associated with the business entity electronically communicates with the user 120.

The messaging application 440 may arrange for the communication module 560 to receive (e.g. by fetching a phone number from the storage location 160 and presenting it to that module and requesting that a call be made to the user 120), an analog audio signal (e.g. a sound wave) from the user 120 or digital audio data from the mobile phone or a land line phone used by the user 120. The communication module 560 then may transfer the received audio signal or data to a sound recorder 580, which may process the signal or data and convert it to a proper from (e.g. convert the analog signal to digital data after some amplification and modification) for storage in the storage location 160 associated with the user 120.

In an example embodiment the server 510 may provide the user 120 with a plurality of audio data instances (e.g. sound waves) and ask the user 120 to select a preferred audio data instance to be used to authenticate the communication from the business entity.

Whenever an agent 520 tries to electronically communicate with the user 120, the server 510 may play back the audio data or the sound wave associated with the user 120 to the user 120. To perform the play back, the messaging application 440 may invoke the storage location 160 to retrieve the stored audio data associated with the user 120 and transfer the stored audio data to the sound player 550. The sound player 550 may then process the transferred audio data (e.g. convert it to a proper audio signal ready to be communicated to the user 120) and pass it to the communication module 560. The communication module 560 may then playback the audio signal to the user 120, during the call to the mobile phone or the land line phone used by the user 120. In an example embodiment, the playback may be invoked if it is requested by the user 120.

Figure 6:
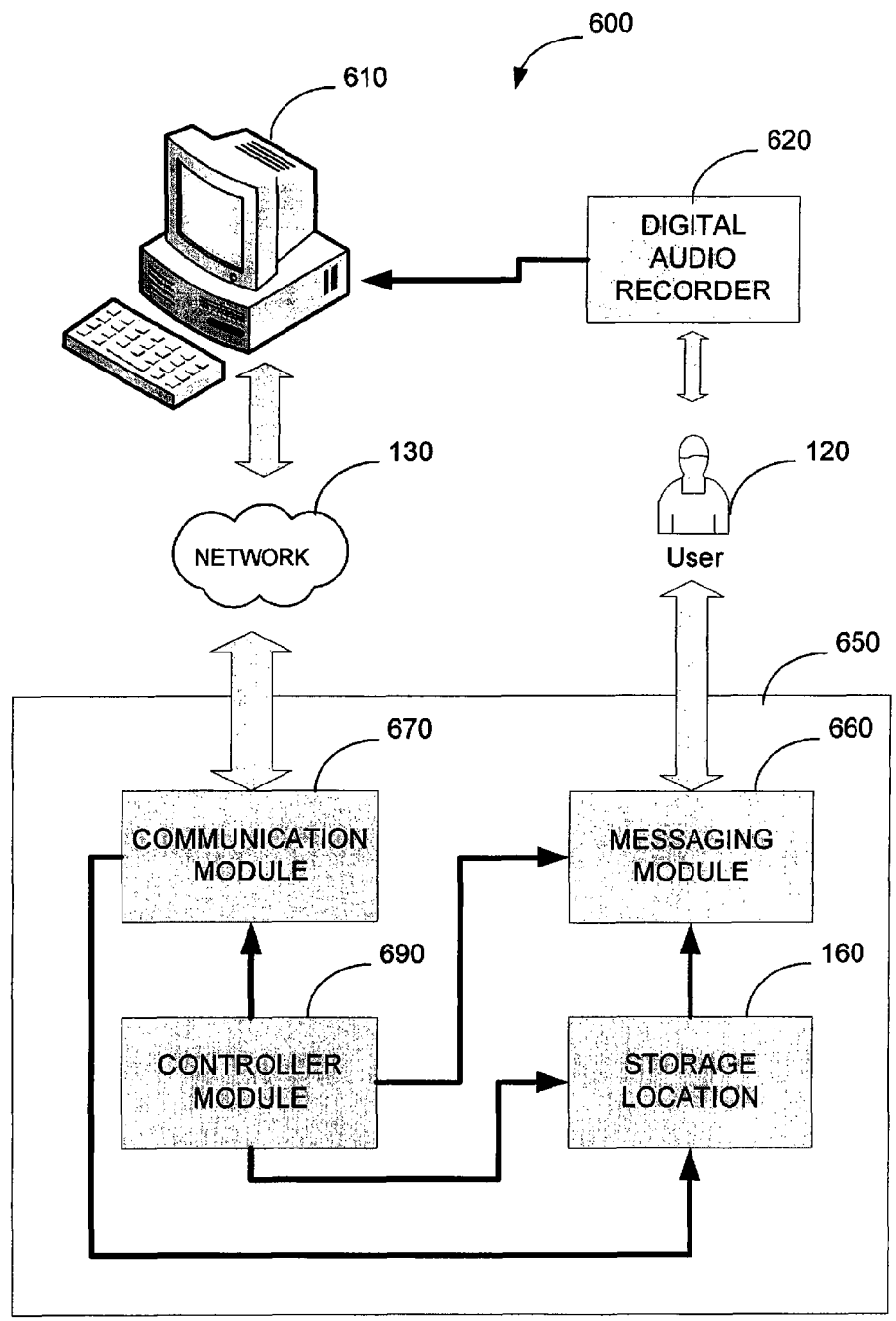
FIG. 6 is a block diagram illustrating an example embodiment of a system for receiving, storing and playing back sound waves.

FIG. 6 is a block diagram illustrating an example embodiment of a system for receiving, storing and playing back sound waves. In this example embodiment, the audio data to be used for authentication may be provided by the user 120 via a digital audio recorder 620 coupled to a personal computer 610 and communicated, via the network 130, to the server 650.

The server 650 may include a communication module 670, a messaging module 660, the storage location 160 and a controller module 690. The communication module 670 may receive the audio data associated with the user 120 from the network 130 and transfer it to the storage location 160. Upon any phone call to the user 120 from the server 650, the messaging module 660 may authenticate the call by presenting the user 120 with the stored audio data associated with the user 120 received from the storage location 160 The controller module 690 is coupled to the communication module 670, the messaging module 660, and the storage location 160; and provide them with command and control signals necessary to coordinate the functions performed by above modules.

In example embodiments, the user 120 may use the digital audio recorder 620 to record any preferred audio signal such as the user's voice reciting a specific text, singing a song, or making a special sound. The user 120 may also use an object (e.g. a musical instrument) to make the audio signal.

Sequences Diagrams

Figure 7:
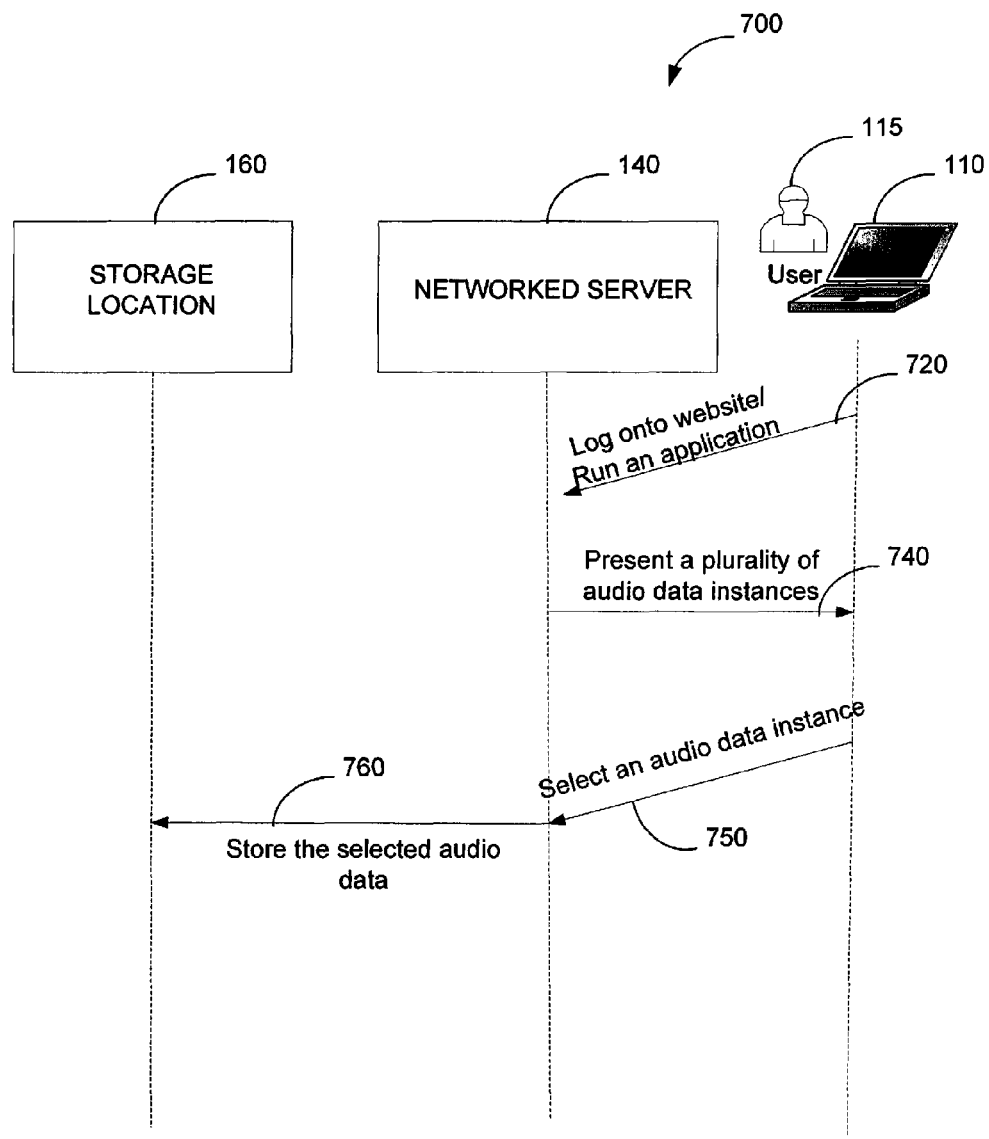
FIG. 7 is a sequence diagram illustrating an example embodiment of a method for receiving and storing audio data from a user.

FIG. 7 is a sequence diagram illustrating an example embodiment of a method 700 for receiving and storing audio data from a user. Method 700 may start by the user 115 of the client system 110 logging into the website of a business entity hosted by the networked server 140 (operation 720). The user 115 may then at operation 740 be presented with a plurality of audio data (e.g. sound waves) to select from. The selected audio data (e.g. the preferred sound wave) at operation 750 may then be stored in the storage location 160, associated with the user 115 (operation 760). The stored audio data may be used for validation of the identity of the business entity in future electronic communication of the business entity with the user 115.

Figure 8:
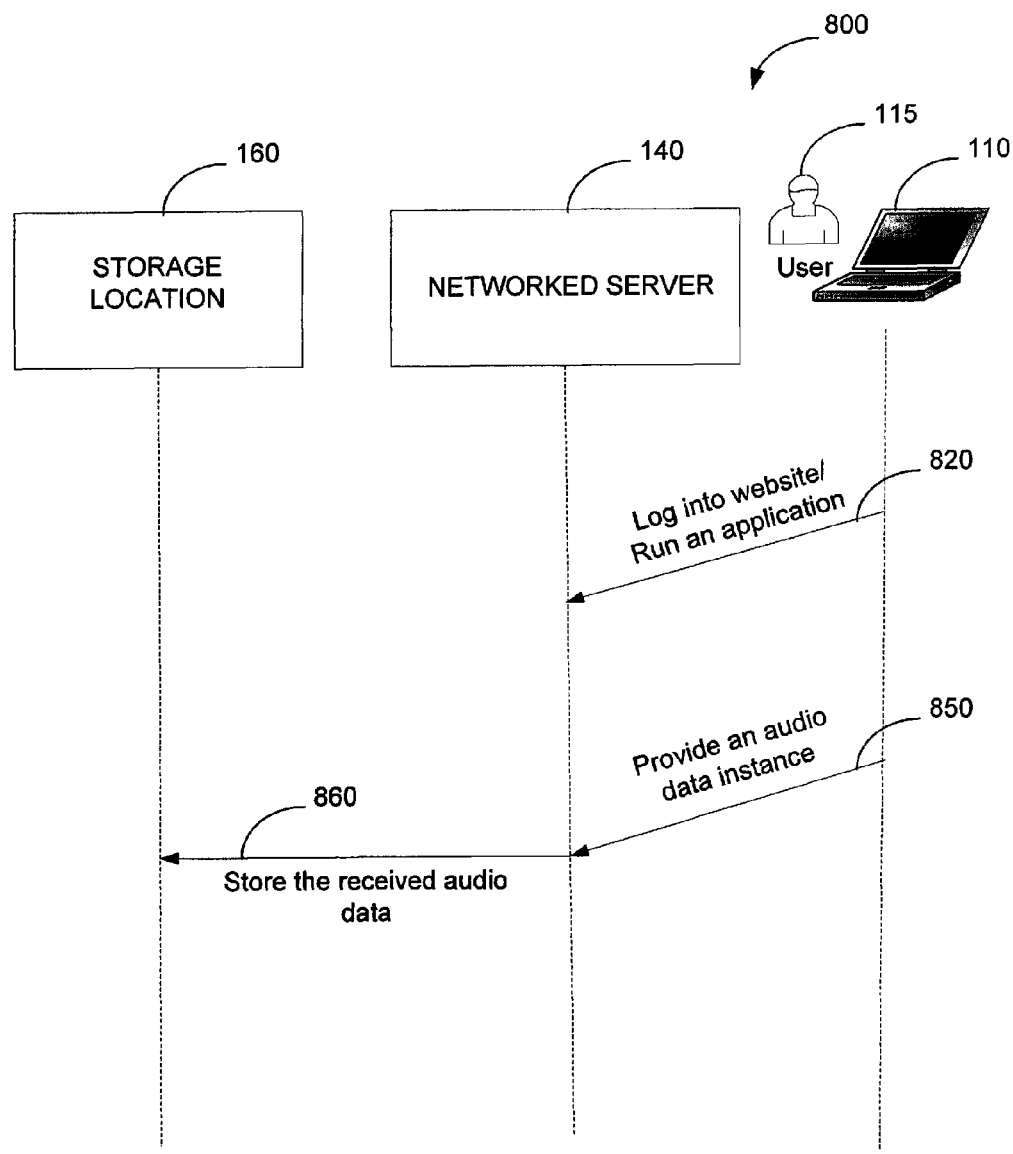
FIG. 8 is a sequence diagram illustrating an example embodiment of a method for receiving and storing audio data from a user.

FIG. 8 is a sequence diagram illustrating an example embodiment of a method 800 for receiving and storing audio data from a user. The method 800 starts with the user 115 of the client system 110 logging into the website of a business entity hosted by the networked server 140 (operation 820). The user 115 at operation 850 may provide an audio data instance to the networked server 140. The networked server 140 then at operation 860 may store the received audio data in the storage location 160 associated with the user 115.

In example embodiments, the user 115 may use the digital audio recorder 620 of FIG. 6 to record any preferred audio signal such as the user's voice reciting a specific text, singing a song, or making a special sound. The user 115 may also use an object (e.g. a musical instrument) to make the audio signal.

Figure 9:
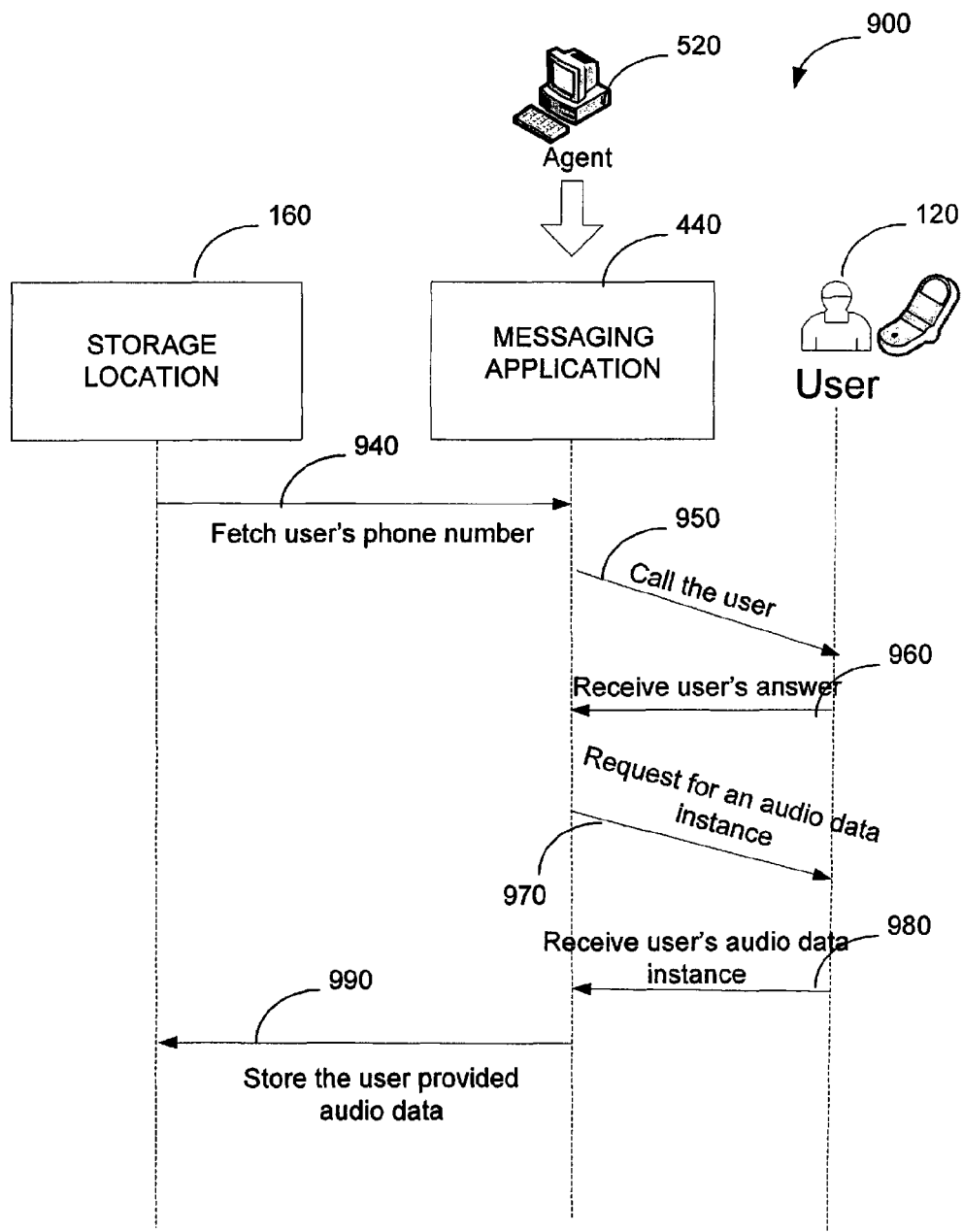
FIG. 9 is a sequence diagram illustrating an example embodiment of a method for receiving and storing audio data from a user.

FIG. 9 is a sequence diagram illustrating an example embodiment of a method 900 for receiving and storing audio data from a user. According to the example method 900, an agent 520 of a business entity may invoke the messaging application 440 of the application server 400 to call the user 120 and receive an audio data instance to be used to identify the business entity, in future electronic communication with the user 120. The messaging application 440, at operation 940, may fetch the phone number of the user 120 from the storage location 160 and at operation 950, the messaging application 440 may call the user 120. At operation 960 the response to the call may be received from the user 120 by the messaging application 440. The messaging application 440 may at operation 970 request the user 120 to provide an audio instance. The audio instance may be received, at operation 980, by the messaging application 440 from the user 120. At operation 990, the messaging application may store the received audio instance in the storage location 160 associated with the user 120.

In example embodiments, the calling of the user 120 by the messaging application 440, may include text-based communication (e.g., electronic mail (e-mail), instant message (IM), Short Message Service (SMS), facsimile), or audio communication over the Internet (e.g., Voice over IP (VoIP), or SKYPE, an Internet telephony service), or telephone call using wired Plain Old Telephone Service (POTS), or wireless networks (e.g., mobile, cellular, WiFi, and WiMAX).

In example embodiments, the user 120 may use the digital audio recorder 620 of FIG. 6 to record any preferred audio signal such as the user's voice reciting a specific text, singing a song, or making a special sound. The user 120 may also use an object (e.g. a musical instrument) to make the audio signal.

Figure 10:
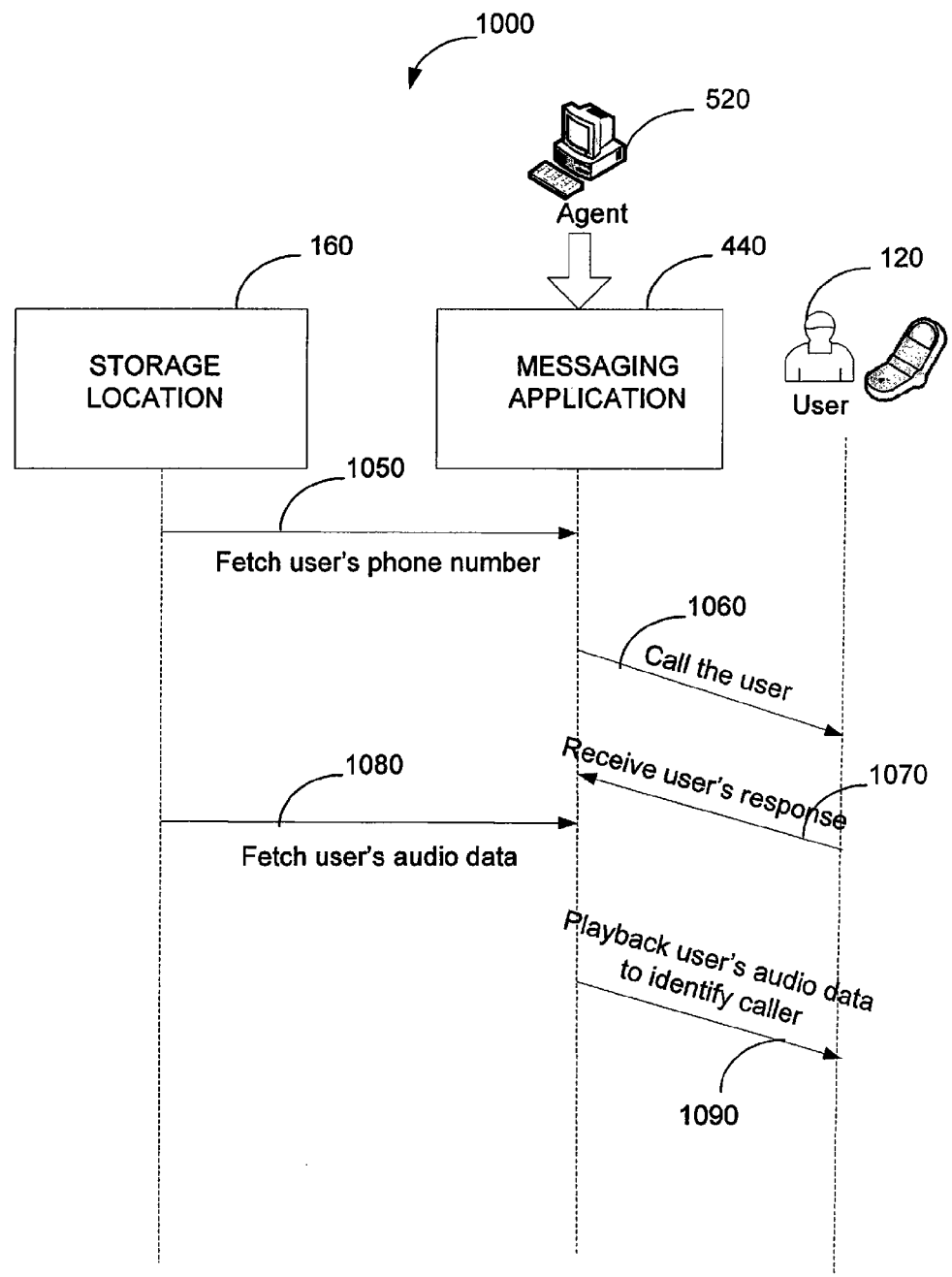
FIG. 10 is a sequence diagram illustrating an example embodiment of a method for authenticating a call from a messaging application to a user using pre-stored audio data.

FIG. 10 is a sequence diagram illustrating an example embodiment of a method for authenticating a call from a messaging application to a user using pre-stored audio data. According to the example embodiment method 1000, an agent 520 of a business entity may invoke the messaging application 440 of the application server 400 to call the user 120 and receive an audio data instance to be used to identify the business entity, in future electronic communication with the user 120. The messaging application 440, at operation 1050, may fetch the phone number of the user 120 from the storage location 160 and at operation 1060; the messaging application 440 may call the user 120. At operation 1070 the response to the call may be received from the user 120 by the messaging application 440. The messaging application 440 may at operation 1080 fetch the audio data associated with the user 120 from the storage location 160. At operation 1090 the messaging application 440 may playback the audio data to the user 120, in order to authenticate the call to the user 120.

In example embodiments, the agent 520 may be a live agent representing the business entity (e.g., a financial institution, a networked based commerce system, etc.), or an agent computer system automatically initiating calls to user 120.

In example embodiments, the calling of the user 120 by the agent 520, may include using text-based communication (e.g., electronic mail (e-mail), instant message (IM), Short Message Service (SMS), facsimile), or audio communication over the Internet (e.g., Voice over IP (VoIP), or SKYPE, an Internet telephony service), or telephone call using wired Plain Old Telephone Service (POTS), or wireless networks (e.g., mobile, cellular, WiFi, and WiMAX).

Figure 11:
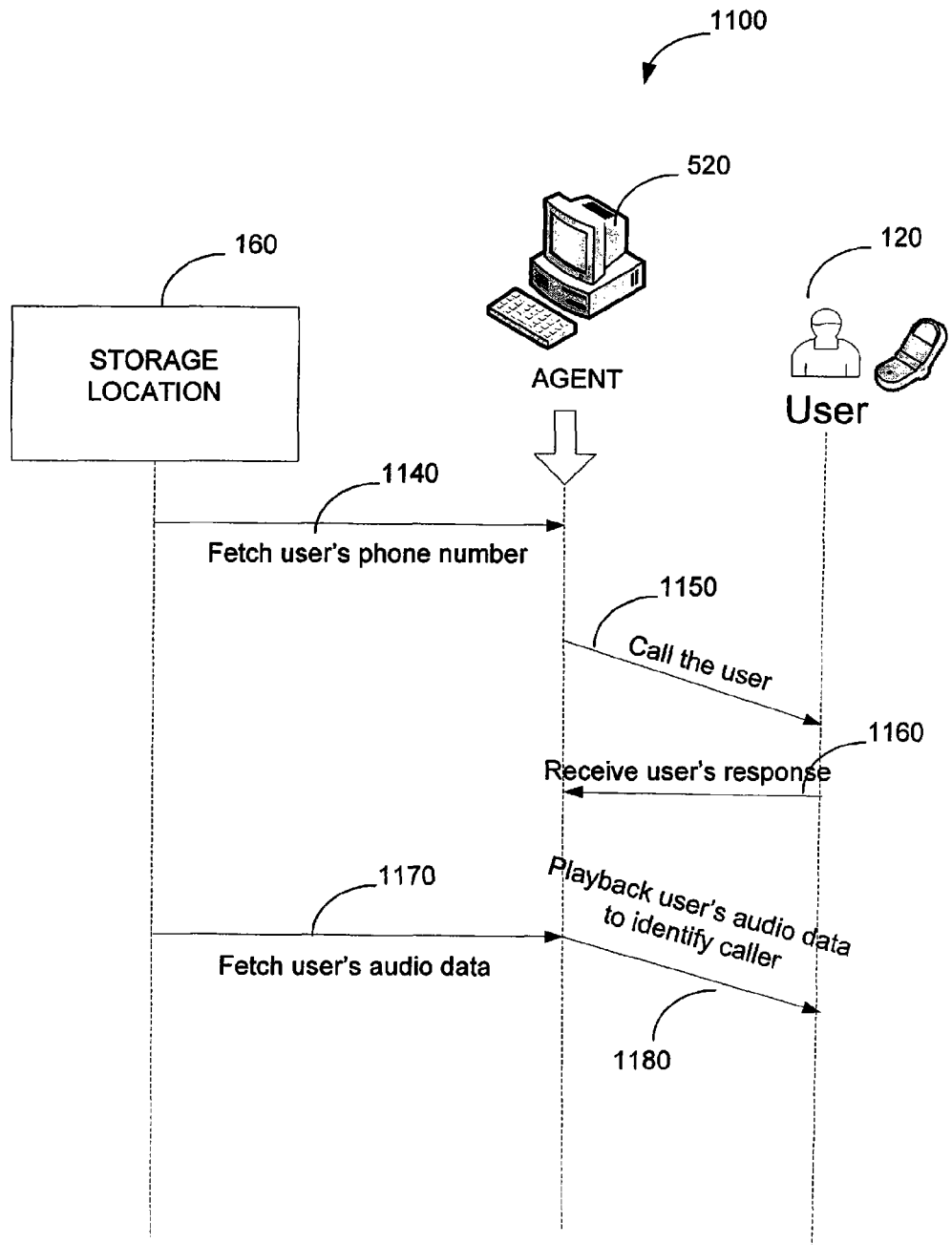
FIG. 11 is a sequence diagram illustrating an example embodiment of a method for authenticating a call from an agent to a user using pre-stored audio data.

FIG. 11 is a sequence diagram illustrating an example embodiment of a method 1100 for authenticating a call from an agent to a user using pre-stored audio data. According to the example embodiment method 1100, an agent 520 of a business entity may call the user 120 and receive an audio data instance to be used to identify the business entity, in future electronic communication with the user 120. The agent 520, at operation 1140, may fetch the phone number of the user 120 from the storage location 160 and at operation 1150; the agent 520 may call the user 120. At operation 1160 the response to the call may be received from the user 120 by the agent 520. The agent 520 may at operation 1170 fetch the audio data associated with the user 120 from the storage location 160. At operation 1180 the agent 520 may playback the audio data to the user 120, in order to authenticate the call to the user 120.

In example embodiments, the agent 520 may be live agent representing the business entity (e.g., a financial institution, a networked based commerce system, etc.) or an agent computer system automatically initiating calls to user 120

In example embodiments, the calling of the user 120 by the messaging application 440, may include using text-based communication (e.g., electronic mail (e-mail), instant message (IM), Short Message Service (SMS), facsimile), or audio communication over the Internet (e.g., Voice over IP (VoIP), or SKYPE, an Internet telephony service), or telephone call using wired Plain Old Telephone Service (POTS), or wireless networks (e.g., mobile, cellular, WiFi, and WiMAX).

Flow Diagrams

Figure 12:
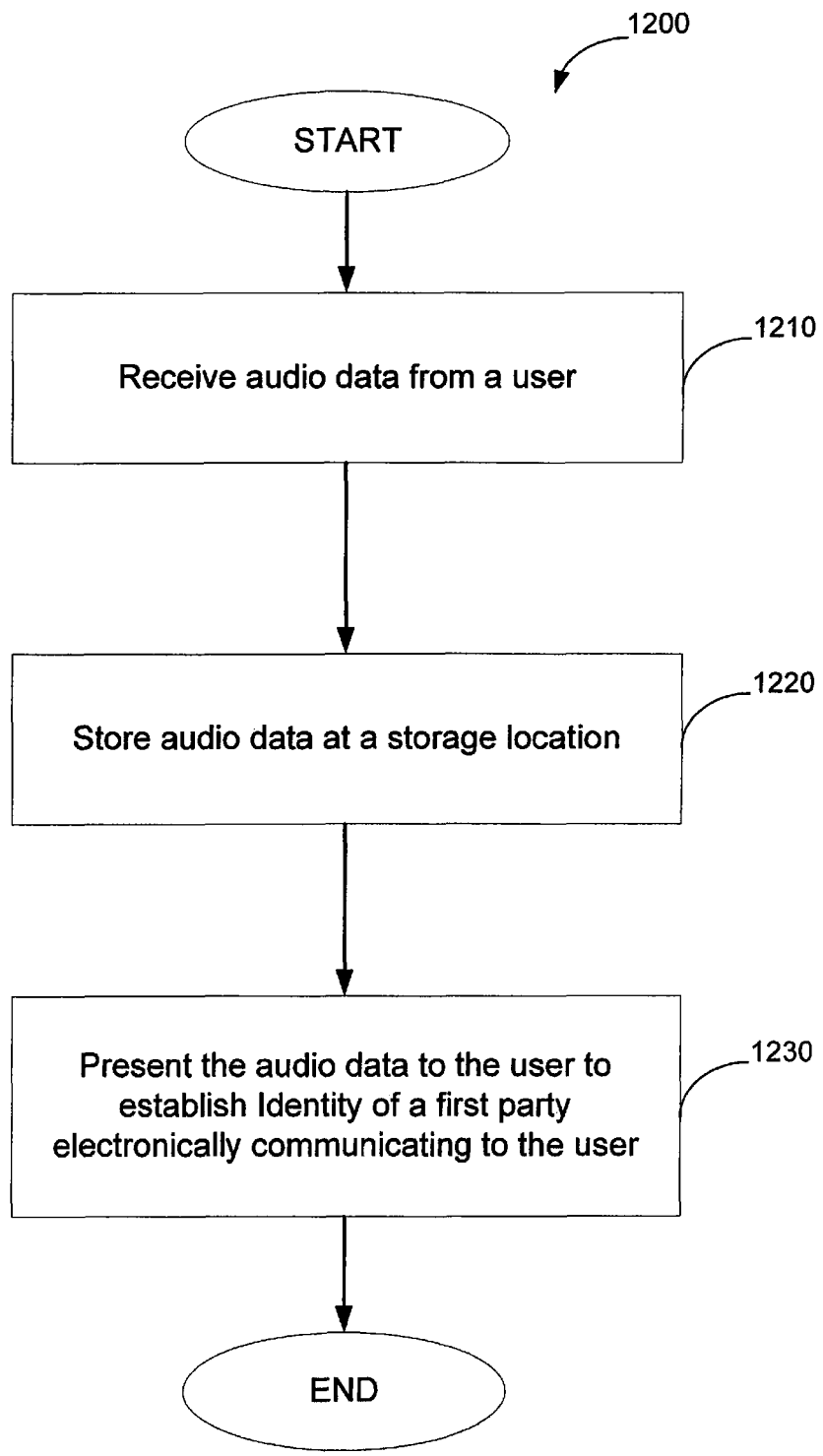
FIG. 12 is a flow diagram illustrating an example embodiment of a method for receiving audio data and using the audio data for authenticating a communication to a user.

FIG. 12 is a flow diagram illustrating an example embodiment of a method 1200 for receiving audio data and using the audio data for authenticating a communication to a user. The method 1200 starts at operation 1210. At this operation the networked server 140, via the communication module 150 may receive an audio data instance from the user 120 (see FIG. 1). AT operation 1220, the networked server 140 may store the received audio data at the storage location 160. The communication module 150 may retrieve the stored audio data from the storage location 160 and present the retrieved audio data to the of the user 120 or the user 115 of the client system 110, in future electronic communications with users 120 and 115 (operation 1230).

In example embodiments, the electronic communication with user 120 by the messaging application 440, may include using text-based communication (e.g., electronic mail (e-mail), instant message (IM), Short Message Service (SMS), facsimile), or audio communication over the Internet (e.g., Voice over IP (VoIP), or SKYPE, an Internet telephony service), or telephone call using wired Plain Old Telephone Service (POTS), or wireless networks (e.g., mobile, cellular, WiFi, and WiMAX).

Figure 13:
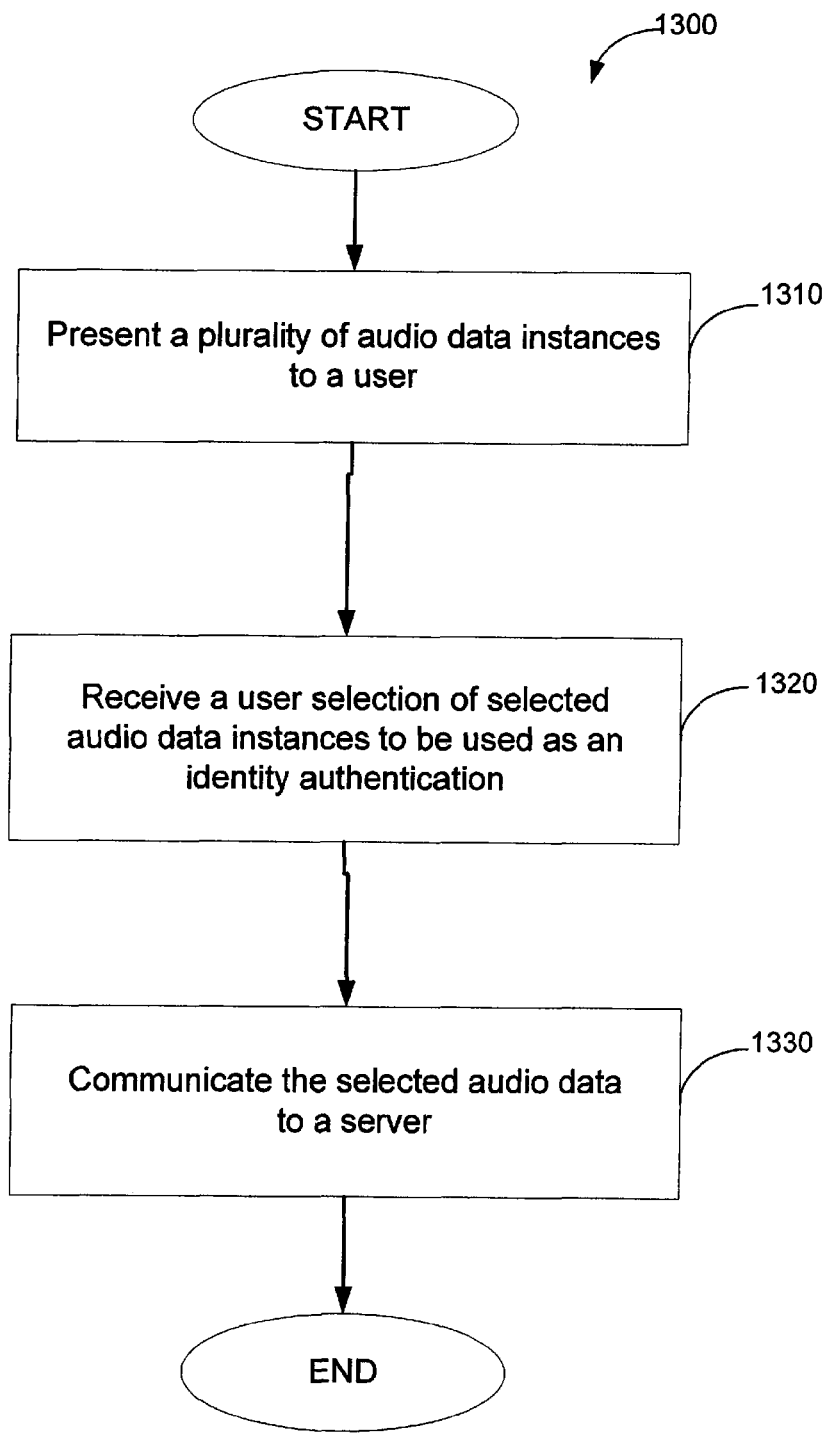
FIG. 13 is a flow diagram illustrating an example embodiment of a method for receiving a selected audio data from a user and using the audio data for authenticating a communication to the user.

FIG. 13 is a flow diagram illustrating an example embodiment of a method 1300 for receiving a selected audio data from a user and using the audio data for authenticating a communication to the user. According to the example method 1300, the user 115 of the client system 110 may be presented a plurality of audio data (operation 1310). The users may be requested to make a selection of the presented audio data. The receiver 250 of the subsystem 240 (see FIG. 2) may then, at operation 1320, receive, via the network 130, the selected audio data from the client system 110 and transfer it to the communication module 260. The communication module 260 then may communicate, via the network 130, the received audio data to the networked server 140 (operation 1330. The server 140 may then store the audio data at storage location 160 associated with the user 115. The stored audio data may then be played back to the user 115 in future electronic communication with the user 115 or user 120 (see FIG. 1).

Machine Architecture

Figure 14:
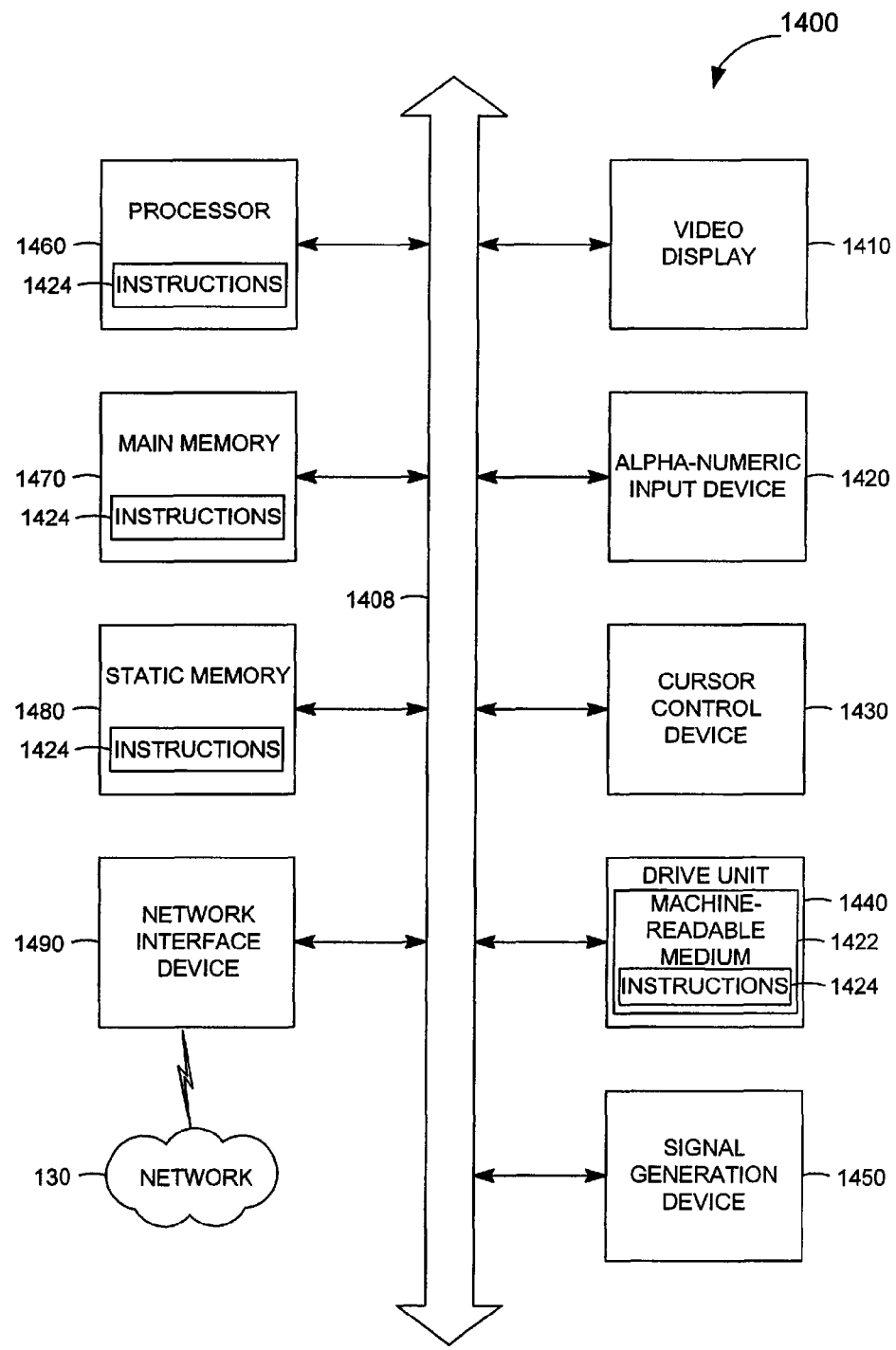
FIG. 14 is a block diagram illustrating a diagrammatic representation of a machine in the example form of a computer system.

FIG. 14 is a block diagram, illustrating a diagrammatic representation of machine 1400 in the example form of a computer system within which a set of instructions, for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 may include a processor 1460 (e.g., a central processing unit (CPU) a graphics processing unit (GPU) or both), a main memory 1470 and a static memory 1480, which communicate with each other via a bus 1830. The computer system 1400 may further include a video display unit 1410 (e.g., liquid crystal displays (LCD) or cathode ray tube (CRT)). The computer system 1400 also may include an alphanumeric input device 1420 (e.g., a keyboard), a cursor control device 1430 (e.g., a mouse), a disk drive unit 1440, a signal generation device 1450 (e.g., a speaker) and a network interface device 1490.

The disk drive unit 1440 may include a machine-readable medium 1422 on which is stored one or more sets of instructions (e.g., software 1424) embodying any one or more of the methodologies or functions described herein. The software 1424 may also reside, completely or at least partially, within the main memory 1470 and/or within the processor 1460 during execution thereof by the computer system 1400, the main memory 1470 and the processor 1460 also constituting machine-readable media.

The software 1424 may further be transmitted or received over a network 426 via the network interface device 1490.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a method and system to authenticate communication between a system and a user have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    establishing a first electronic networked communication between a client device of a user and a website hosted by an entity;
    receiving an audio data instance recorded by the user, from the client device, during the first electronic communication, the audio data instance being used to establish an identity of the entity to the user;
    establishing, using one or more processors, a second electronic communication between the user and the entity, the entity requesting communication with the user to establish the second electronic communication;
    receiving a validation of the identity of the user prior to the presenting the audio data instance selected during the first electronic communication to the user; and
    presenting the audio data instance selected during the first electronic communication to the user during the second electronic communication for identity authentication in response to the user accepting the request from the entity and participating in the second electronic communication and in response to the received validation of the identity of the user.

2. The method of claim 1, wherein the establishing the second electronic communication between the user and the entity includes establishing a telephone call between the entity and the user.

3. The method of claim 1, wherein the establishing the second electronic communication includes retrieving a phone number of the user from a database maintained by a server.

4. The method of claim 1, further comprising:
    storing the audio data instance in a database maintained by a server, and wherein the presenting the audio data instance to the user includes retrieving the audio data instance from the database maintained by the server.

5. The method of claim 1, wherein the second electronic communication between the user and the entity includes a first device associated with the user and a second device associated with the entity.

6. The method of claim 5, wherein the presenting the audio data instance to the user during the second electronic communication includes sending the audio data instance to the first device.

7. The method of claim 1, wherein the first electronic communication includes at least one of:
audio communication over the Internet, Voice over IP, Plain Old Telephone Service, or telephone call over wireless networks.

8. The method of claim 1, further comprising:
receiving a request to present the audio data instance, and wherein the presenting the audio data instance to the user is performed in response to receipt of the request.

9. A system comprising:
a messaging application, implemented using one or more processors, to:
establish a first electronic networked communication between a client device of a user and a website hosted by an entity;
receive an audio data instance recorded by the user, from the client device, during the first electronic communication, the audio data instance being used to establish an identity of the entity to the user;
establish a second electronic communication between the user and the entity, the entity requesting communication with the user to establish the second electronic communication;
receive a validation of the identity of the user prior to the presenting the audio data instance selected during the first electronic communication to the user; and
present the audio data instance to the user during the second electronic communication for identity authentication in response to the user accepting the request from the entity and participating in the second electronic communication and in response to the received validation of the identity of the user; and
a sound recorder to store the audio data instance at a database maintained by a server.

10. The system of claim 9, wherein the messaging application is further configured to establish a telephone call between the entity and the user.

11. The system of claim 9, wherein the messaging application is further configured to:
retrieve a phone number of the user from the database maintained by the server.

12. The system of claim 9, wherein the sound recorder is further configured to retrieve the audio data instance from the database maintained by the server.

13. The system of claim 9, wherein the second electronic communication between the user and the entity includes a first device associated with the user and a second device associated with the entity.

14. The system of claim 13, wherein the messaging application is further configured to send the audio data instance to the first device.

15. The system of claim 9, wherein the messaging application is further configured to:
receive a request to present the audio data instance, and wherein the presentation of the audio data instance to the user is performed in response to receipt of the request.

16. A non-transitory machine-readable medium storing instructions that, when executed by one or more processors of a machine, cause the machine to perform operations comprising:
establishing a first electronic networked communication between a client device of a user and a website hosted by an entity;
receiving an audio data instance recorded by the user, from the client device, during the first electronic communication, the audio data instance being used to establish an identity of the entity to the user;
establishing, using one or more processors, a second electronic communication between the user and the entity, the entity requesting communication with the user to establish the second electronic communication;
receiving a validation of the identity of the user prior to the presenting the audio data instance selected during the first electronic communication to the user; and
presenting the audio data instance selected during the first electronic communication to the user during the second electronic communication for identity authentication in response to the user accepting the request from the entity and participating in the second electronic communication and in response to the received validation of the identity of the user.

* * * * *